United States Patent
Jia et al.

(10) Patent No.: US 7,283,832 B2
(45) Date of Patent: *Oct. 16, 2007

(54) METHOD AND SYSTEM FOR ESTABLISHING WIRELESS PEER-TO-PEER COMMUNICATIONS

(75) Inventors: Qunli Jia, Shanghai (CN); Ni Ma, Shanghai (CN); Li Sun, Shanghai (CN); Xuejun Zhang, Shanghai (CN)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/547,585

(22) PCT Filed: Mar. 1, 2004

(86) PCT No.: PCT/IB2004/050179

§ 371 (c)(1),
(2), (4) Date: Sep. 1, 2005

(87) PCT Pub. No.: WO2004/077917

PCT Pub. Date: Sep. 16, 2004

(65) Prior Publication Data

US 2006/0229092 A1    Oct. 12, 2006

(30) Foreign Application Priority Data

Mar. 7, 2003 (CN) .............................. 03 1 19897.X

(51) Int. Cl.
*H04B 7/00* (2006.01)
*H04Q 7/20* (2006.01)

(52) U.S. Cl. ...................... 455/517; 455/502; 455/511; 455/514; 455/518; 455/522; 455/526; 455/415; 455/416; 455/428; 455/455; 455/3.05; 455/90.2; 455/90.3; 370/278; 370/330; 370/335

(58) Field of Classification Search ................ 455/517, 455/502, 509, 511, 514, 515, 518, 519, 522, 455/526, 415, 416, 428, 455, 3.05, 90.2, 455/90.3, 426.1, 426.2; 370/278, 330, 335
See application file for complete search history.

(56) References Cited

U.S. PATENT DOCUMENTS 6,415,146 B1    7/2002    Capece (Continued)

*Primary Examiner*—Matthew D. Anderson
*Assistant Examiner*—Shaima Q. Aminzay

(57) ABSTRACT

The present invention provides a wireless network system for establishing peer-to-peer communication between mobile terminals. Upon determining that peer-to-peer communication can be established between two mobile terminal, the wireless network system transmits to each of the mobile terminals information about radio resources used by the other one of the mobile terminals. Each mobile terminal then uses the radio resources information to test the characteristics of a dedicated uplink channel between the other one of the mobile terminals and the network system. Thus, no separate radio channel needs to be allocated for the channel testing. Furthermore, each mobile terminal uses the same radio resources to establish a dedicated radio channel in the peer-to-peer communication with the other one of the mobile terminals, which were previously used by itself for communication with the network system on the dedicated uplink channel. In this way, the network system does not need to allocate additional radio resources for establishing the peer-to-peer communication, thus simplifying the radio resources re-allocation scheme, while ensuring that the quality of the channels is the same as tested.

26 Claims, 5 Drawing Sheets

U.S. PATENT DOCUMENTS

| | | | |
|---|---|---|---|
| 6,748,235 B1* | 6/2004 | Shin et al. | 455/522 |
| 7,079,509 B2* | 7/2006 | Belcea | 370/330 |
| 7,099,296 B2* | 8/2006 | Belcea | 370/338 |
| 2002/0094837 A1* | 7/2002 | Hamabe et al. | 455/522 |
| 2003/0092452 A1* | 5/2003 | Youngs et al. | 455/461 |
| 2003/0181217 A1* | 9/2003 | Haas et al. | 455/522 |
| 2004/0214593 A1* | 10/2004 | Shin et al. | 455/522 |
| 2006/0205408 A1* | 9/2006 | Nakagawa et al. | 455/445 |

* cited by examiner

METHOD AND SYSTEM FOR ESTABLISHING WIRELESS PEER-TO-PEER COMMUNICATIONS

BACKGROUND OF THE INVENTION

The invention relates generally to wireless communications systems, and more particularly to self-organizing wireless communication network systems for peer-to-peer communication.

Peer-to-peer communication between two mobile terminals provides a direct link between the two mobile terminals in public land mobile network. When the direct link is established, the dedicated links between the base station and mobile terminals can be disconnected, while the common control channel (CCCH) is maintained. This will save at least two radio channels for the system and reduce the end-to-end delay.

Among existing 3G systems, the TDD CDMA system is the most suitable system for the application of peer-to-peer communication, because the same carrier frequency is used in both uplink and downlink communications, which will simplify the RF module of the mobile terminal. Additionally, the application of peer-to-peer communication technology will overcome some inherent shortcomings of the TDD CDMA system, such as the shortage of spreading code, small coverage, etc. An example of the TDD CDMA system is the TD-SCDMA system, which has gained more popularity in China.

To establish a direct link between two mobile terminals, the two mobile terminals must first be able to properly receive signals from each other. Thus, before establishing the direct link, the two mobile terminals have to test the channel characteristics between themselves. In one scheme, a wireless communication network system allocates a separate channel for the test. After the direct link is established, the network system will allocate additional radio channels for the peer-to-peer communication. However, the channel allocations for these purposes take away valuable radio resources, which are already inadequate. Thus, if the radio resources are used up, a separate channel cannot be allocated for the test. By allocating additional radio channels for the peer-to-peer communication, it also creates complexity in the radio resources re-allocation scheme. Further, since the test is not directly performed on the newly allocated channels between the mobile terminals, there is no assurance that the characteristics of the new channels also meet the requirement for direct communication.

Therefore, there is a need for an improved system for establishing reliable direct links for peer-to-peer communications in a wireless communication system.

SUMMARY OF THE INVENTION

The present invention provides a simple and effective solution for establishing peer-to-peer communication between mobile terminals, which addresses the limitations described above.

According to one embodiment of the invention, upon receiving a request from a mobile terminal for establishing peer-to-peer communication with another mobile terminal, a wireless network system determines whether peer-to-peer communication can be established between them. If peer-to-peer communication can be established between them, the network system transmits a first group of information including control commands to each of the mobile terminals to start testing characteristics of a dedicated uplink channel between the other one of the mobile terminals and the network system. The first group of information also includes information about radio resources currently being used by the other one of the mobile terminals for communicating with the network system on the dedicated uplink control. This enables each mobile terminal to listen to signals transmitted by the other mobile terminal on a dedicated uplink channel with the network system for channel testing. Thus, no separate radio channel is required to be allocated for channel testing for establishing the peer-to-peer communication between the two mobile terminals.

According to this embodiment of the invention, upon receiving status reports on the channel characteristics from the mobile terminals, the network system determines whether the channel characteristics tested by each of the mobile terminals meet a pre-set requirement. If the channel characteristics tested by both of the mobile terminals meet the pre-set requirement, the network system transmits a second group of information including control commands to the mobile terminals to initiate peer-to-peer communication. The second group of information also includes control commands for enabling each of the mobile terminals to use the same radio resources to establish a dedicated radio channel in the peer-to-peer communication with the other one of the mobile terminals, as those that were previously used by itself for communication with the network system on the dedicated uplink channel. In this way, the network system does not need to allocate additional radio resources for establishing the peer-to-peer communication, thus simplifying the radio resources re-allocation scheme, while ensuring that the quality of the channels is the same as tested.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
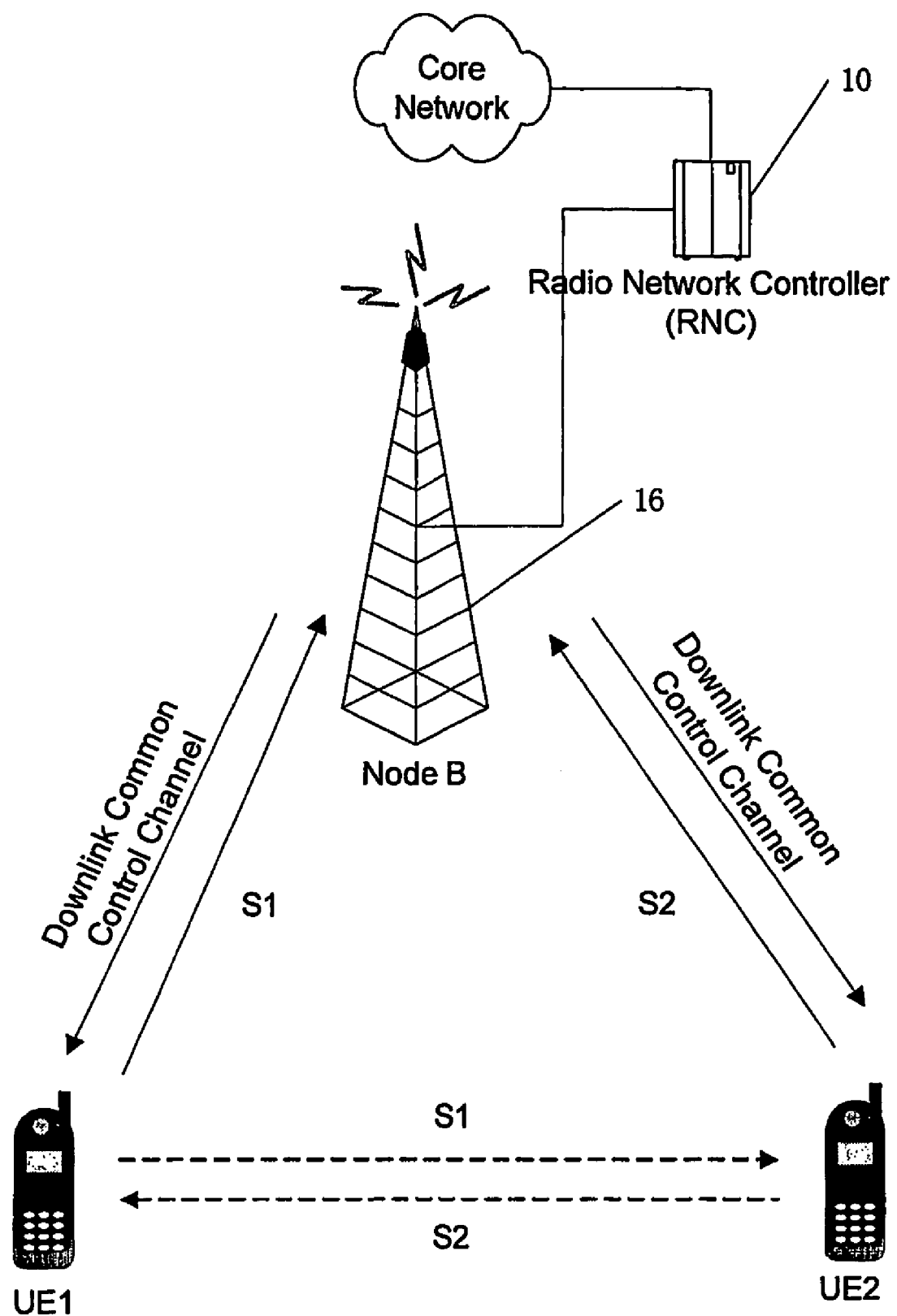
FIG. 1 illustrates an initial stage for setting up peer-to-peer communication in a wireless communication network system environment, according to one embodiment of the invention.

FIG. 1 illustrates an initial stage for setting up peer-to-peer communication in a wireless communication network system (e.g., Universal Terrestrial Radio Access Network (UTRAN)) environment, according to one embodiment of the invention. Before a peer-to-peer communication link is established between two mobile terminals UE1 and UE2, the UTRAN that comprises a radio network controller (RNC) 10 and a Node B (i.e., a base station) 16 will first determine whether the distance between UE1 and UE2 is within the acceptable range for peer-to-peer communication. If so, each of the mobile terminals will be requested to listen to the dedicated uplink channel, S1 or S2, between the UTRAN and the other UE (illustrated by the dash lines in FIG. 1) and test the respective channel characteristics. If the quality of the channels meets the requirements of a direct communication for a pre-determined duration, the mobile terminals will be allowed to use the radio resources originally allocated for linking between the base station and the mobile terminals for the direct communication.

Figure 2:
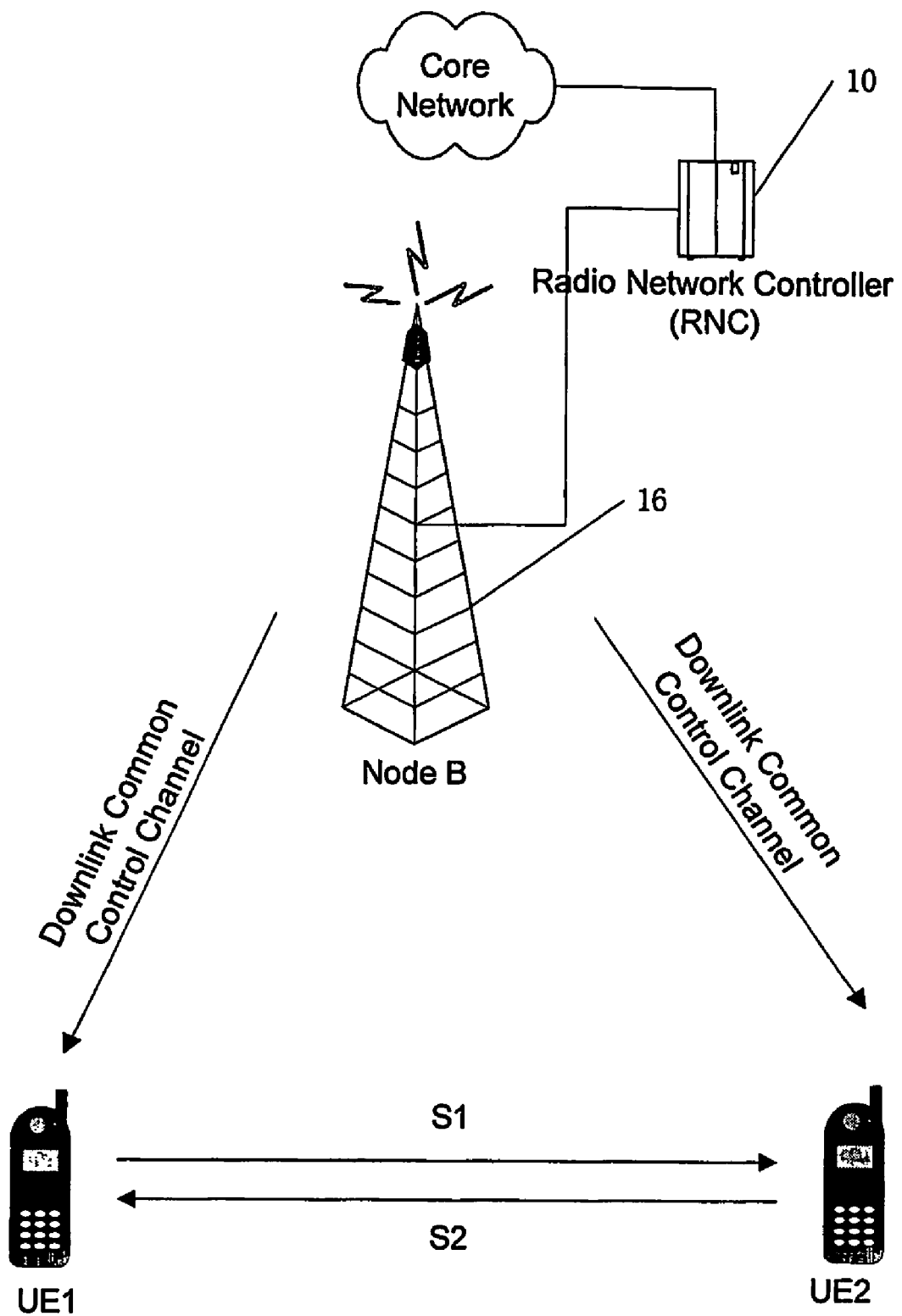
FIG. 2 illustrates a stage after the peer-to-peer communication is established between two mobile terminals, according to one embodiment of the invention.

After the direct communication is established as illustrated in FIG. 2, the UTRAN will disconnect the dedicated channels between base station and mobile terminals. In this way, no dedicated channel is allocated for the test. Furthermore, the base station will not need to allocate separate radio resources for the peer-to-peer communication between the mobile terminals.

Figure 3:
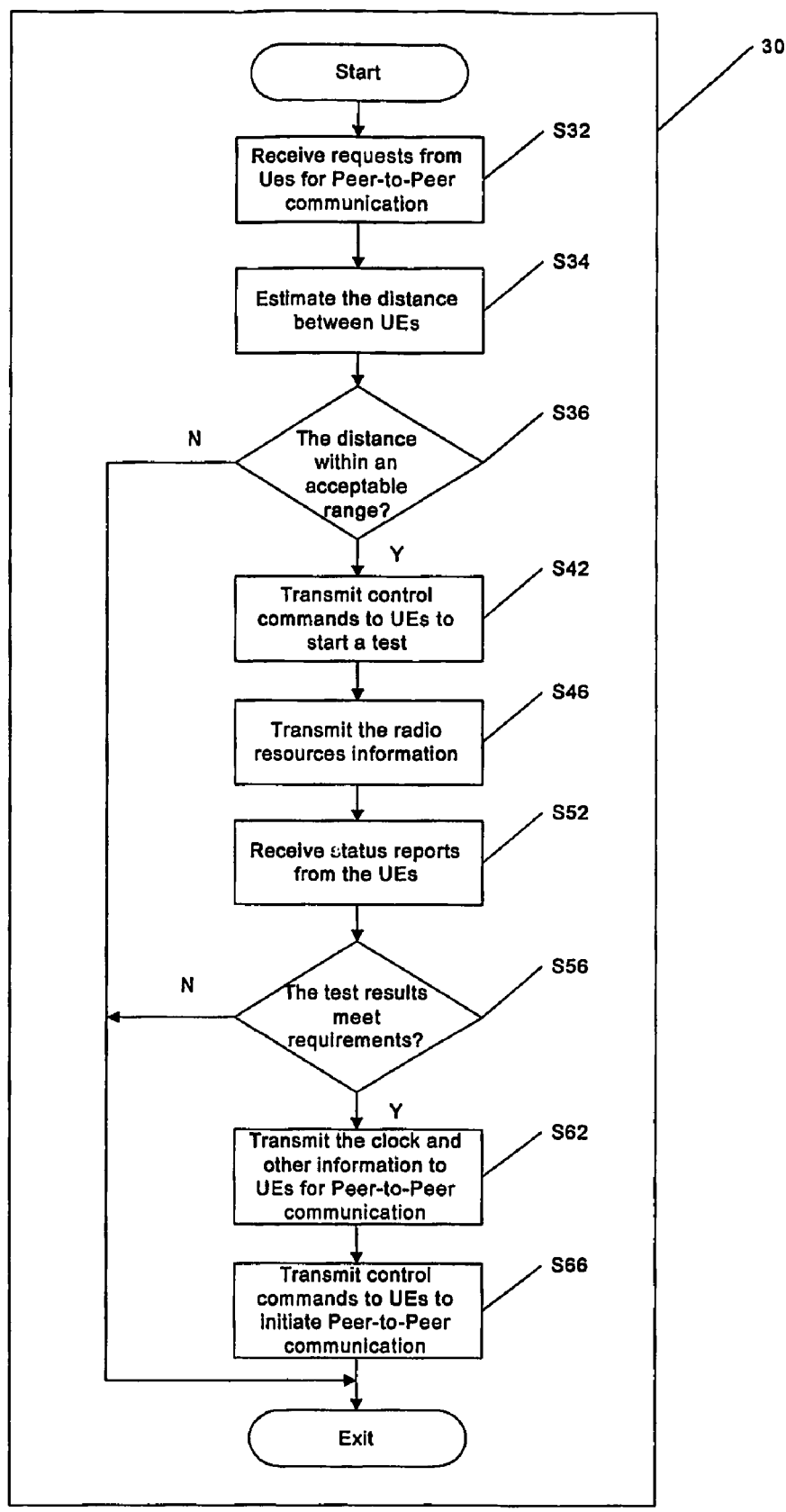
FIG. 3 illustrates a detailed process performed by a wireless communication network system (e.g., a UTRAN) for establishing peer-to-peer communication between two mobile terminals, according to one embodiment of the invention.

FIG. 3 illustrates a detailed process 30 performed by the UTRAN for establishing peer-to-peer communication between two mobile terminals UE1 and UE2, according to one embodiment of the invention. Upon receiving requests from two UEs for peer-to-peer communication (step S32), the UTRAN makes an estimate of the distance between the two UEs, using a known technique, such as the Time Difference of Arrival (TDOA) (step S34). The UTRAN then determines whether the estimated distance is within an acceptable range for peer-to-peer communication (step S36). If the estimated distance fails to meet the requirement, e.g., the UEs are too far away from each other to establish a reliable direct communication link, then the UTRAN will not permit the peer-to-peer communication. Otherwise, the UTRAN will transmit control commands to each of the UEs to start testing the characteristics of the dedicated uplink channel (step S42). In the meantime, the UTRAN transmits the information about the radio resources currently being used by each UE for its dedicated uplink channel to the other UE to allow the other UE to test the channel characteristics (step S46).

After the test, the UEs will transmit status reports with the test results to the UTRAN. Upon receiving the status reports from the UEs (step S52), the UTRAN will determine whether the test results meet the requirements for peer-to-peer communication (step S56). More specifically, the UTRAN will determine whether the relevant SIRs included in the test results meet the SIR requirement for peer-to-peer communication, which is dynamically adjusted by the UTRAN in accordance with the frame error rate (FER). If not, the request for peer-to-peer communication between the two UEs is denied. On the other hand, if they meet the requirement, the UTRAN will transmit the clock and other information to the UEs for setting up the peer-to-peer communication (step S62). The clock information will be used by the two UEs for their mutual synchronization. The UTRAN also transmits control commands to the UEs to initiate peer-to-peer communication and disconnect the dedicated uplink and downlink channels of each UE through downlink signaling (step S66).

Figure 4:
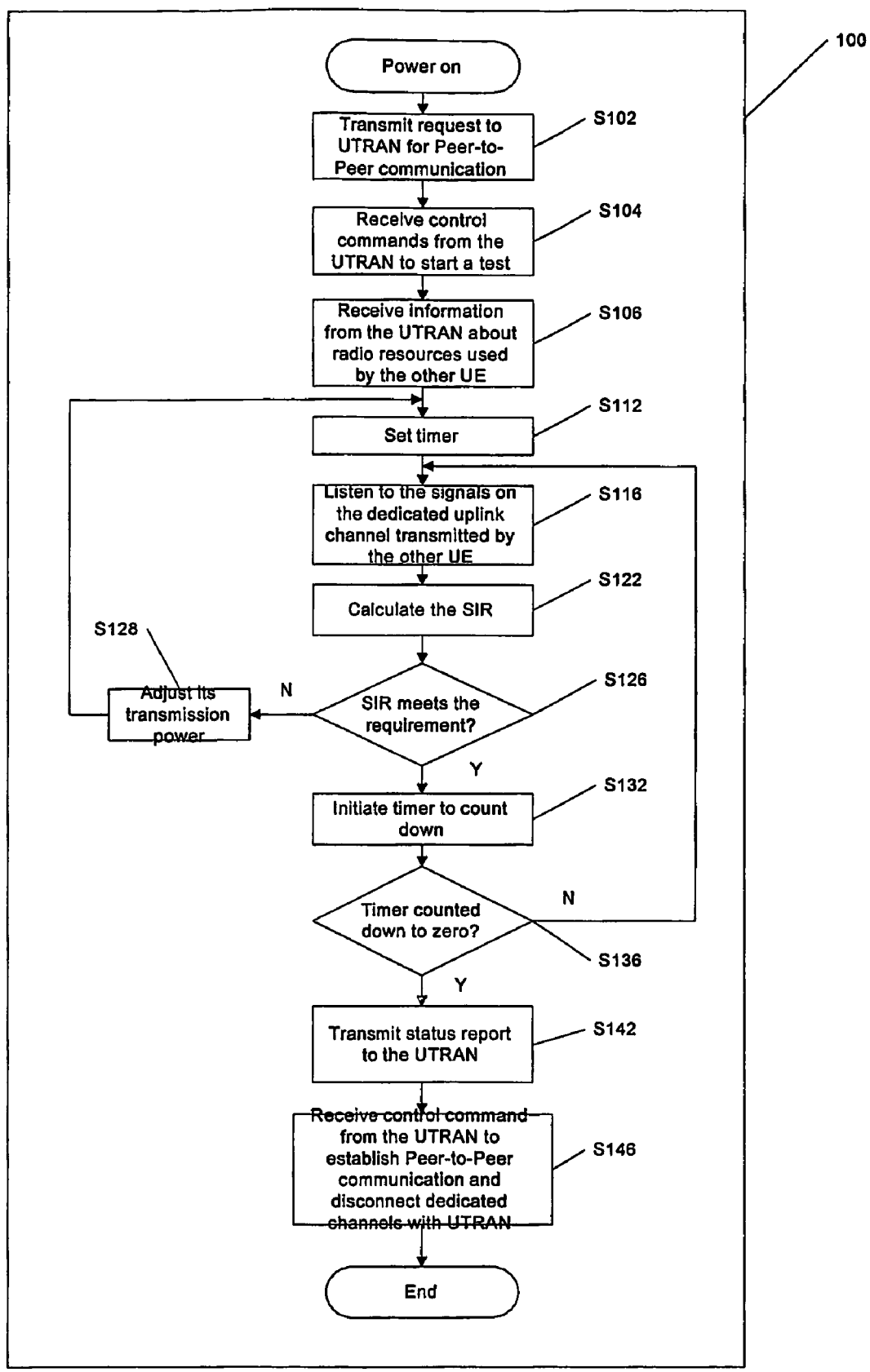
FIG. 4 illustrates a detailed process performed by a mobile terminal for requesting a UTRAN for establishing peer-to-peer communication with another mobile terminal, according to one embodiment of the invention.

FIG. 4 illustrates a process 100 performed by a mobile terminal for requesting the UTRAN for establishing a peer-to-peer communication link with another mobile terminal, according to one embodiment of the invention. After power on and upon determining that it supports peer-to-peer communication, a UE that initiates a call transmits a request to the UTRAN for peer-to-peer communication (step S102). After the UTRAN determines that the two UEs can communicate directly with each other, each UE will receive control commands from the UTRAN to start testing the characteristics of the dedicated uplink channel of the other UE (step S104). Each UE also receives information from the UTRAN about the radio resources currently being used by the other UE for its dedicated uplink channel in order to test the channel characteristics (step S106). The radio resources include the relevant time slot and spreading code allocated to the other UE, as well as the carrier frequency.

Before the test begins, each UE sets an internal timer to a pre-determined time duration for checking whether the channel characteristics can be kept at an acceptable level for the time duration, and adjusts its transmission power to a proper level (step S112). To test the channel characteristics, each UE uses the relevant spreading code provided by the UTRAN to listen to the signals transmitted by the other UE to the UTRAN on the dedicated uplink channel (i.e., in the allocated time slot) (step S116). Each UE then calculates the signal-to-interference ratio (SIR) of that dedicated uplink channel (step S122). In the meantime, the communication between the UEs and the UTRAN is maintained in a normal way. Then, each UE determines whether the respective SIR meets the requirement for peer-to-peer communication (step S126). If the SIR fails to meet the requirement at any time, each UE adjusts its transmission power (step S128), and steps S112 through S122 will be repeated.

On the other hand, if the SIR meets the requirement, the UE will initiate the timer to count down (step S132) and check whether the timer has counted down to zero (step S136). If the timer is less than zero, steps S116 through S136 will be repeated to ensure that the SIR meets the requirement for the pre-determined time duration. After the timer has counted down to zero, the UE transmits a status report with the test results to the UTRAN through uplink signaling (step S142). After the UTRAN determines that a reliable direct communication link can be set up because both SIRs meet the requirement, the UE will receive control commands from the UTRAN to establish peer-to-peer communication with the other UE and disconnect the dedicated uplink and downlink channels with the UTRAN (step S146). Each UE also sets its own clock based on the clock information received from the UTRAN. After the peer-to-peer communication is established, each UE will use the same spreading code to transmit information to the other UE in the same time slot originally allocated to its dedicated uplink channel with the UTRAN.

Figure 5:
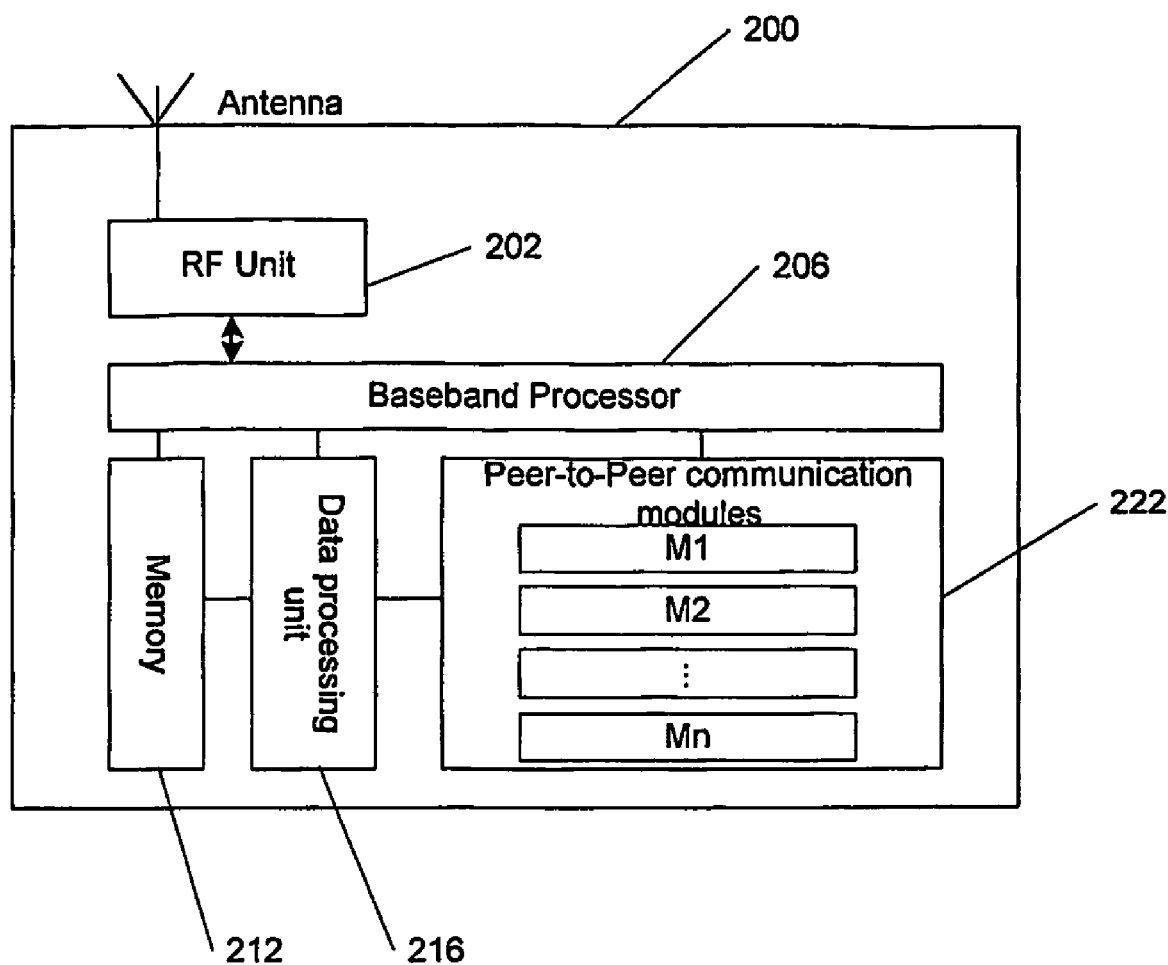
FIG. 5 illustrates basic components of a mobile terminal in accordance with one embodiment of the invention.

FIG. 5 illustrates basic components of a mobile terminal 200 in accordance with one embodiment of the invention. Mobile terminal 200 includes a RF unit 202, a baseband processor 206, a memory 212, a data processing unit 216, and a plurality of peer-to-peer communication modules 222 (i.e., modules M1 through Mn). Communication modules 222 implement the various steps shown in FIG. 4. Each of modules 222 may be either a software module or a combination of software and hardware module. In a preferred embodiment of the invention, the hardware of the existing mobile terminal remains unchanged, while the communication modules 222 are all software modules.

The UTRAN used in the invention has a similar structure as that shown in FIG. 5, and each of the corresponding modules 222 may be either a software module or a combination of software and hardware module for implementing the various steps shown in FIG. 3. Thus, its structure will not be separately illustrated. In a preferred embodiment of the invention, the hardware of the existing UTRAN remains unchanged, while the corresponding modules 222 are all software modules.

In the above, the invention has been illustrated in conjunction with a UTRAN in a TDD based system. However, it is not limited to the TDD based system. In fact, any wireless network system may be used in conjunction with the present invention.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method performed by a wireless network system for establishing peer-to-peer communication, the method comprising the steps of: (a) receiving a request from a mobile terminal for establishing peer-to-peer communication with another mobile terminal; (b) determining whether peer-to-peer communication can be established between the two mobile terminals; (c) if the peer-to-peer communication can be established, transmitting a first group of information including control commands to each of the mobile terminals to start testing characteristics of a dedicated uplink channel between the other one of the mobile terminals and the network system; (d) receiving status reports on the channel characteristics from the mobile terminals; (e) determining whether the channel characteristics tested by each of the mobile terminals meet a pre-set requirement; and (f) if the channel characteristics tested by both of the mobile terminals meet the pre-set requirement, transmitting a second group of information including control commands to the mobile terminals to initiate peer-to-peer communication.

2. The method of claim 1, wherein transmission of the first and second groups of information is from a base station and wherein step (b) includes the steps of: (i) estimating a distance between the two mobile terminals; and (ii) determining whether the distance is within an acceptable range for peer-to-peer communication.

3. The method of claim 1, wherein the first group of information further includes information about radio resources currently being used by the other one of the mobile terminals for communicating with the network system on the dedicated uplink control.

4. The method of claim 3, wherein the information about the radio resources includes a time slot and a spreading code.

5. The method of claim 1, wherein the second group of information further includes control commands for enabling each of the mobile terminals to use the same radio resources to establish a dedicated radio channel in the peer-to-peer communication with the other one of the mobile terminals, as those that were previously used by itself for communication with the network system on the dedicated uplink channel.

6. The method of claim 1, wherein the second group of information further includes clock information.

7. A method performed by a mobile terminal for establishing peer-to-peer with another mobile terminal, the method comprising the steps of: (a) transmitting a request to a wireless network system for establishing peer-to-peer communication with the other mobile terminal; (b) receiving a first group of information including control commands from the network system to start testing characteristics of a dedicated uplink channel between the other mobile terminal and the network system; (c) listening to signals transmitted by the other mobile terminal through the dedicated uplink channel; (d) determining whether the channel characteristics meet a pre-set requirement for a pre-determined duration; (e) transmitting a status report to the network system if the channel characteristics meet the pre-set requirement for the pre-determined duration; and (f) receiving a second group of information including control commands from the network system to establish peer-to-peer communication with the other mobile terminal.

8. The method of claim 7, further comprising a step of disconnecting all dedicated channels with the network system after peer-to-peer communication with the other mobile terminal is established and wherein transmission of the first and second groups of information is from a base station.

9. The method of claim 7, wherein the first group of information further includes information about radio resources currently being used by the other mobile terminal for communicating with the network system on the dedicated uplink channel.

10. The method of claim 9, wherein the information about the radio resources includes a time slot and a spreading code.

11. The method of claim 9, further comprising a step of establishing a dedicated channel in peer-to-peer communication with the other mobile terminal, using the same radio resources as those that were previously used by itself for communicating with the network system on the dedicated uplink channel.

12. The method of claim 7, wherein step (d) includes: (i) calculating a signal-to-interference (SIR) ratio with respect to the dedicated uplink channel between the other mobile terminal and the network system; and (ii) determining whether the SIR meets the pre-set requirement.

13. The method of claim 12, wherein step (d) further includes: (iii) setting a timer; and (iv) initiating the timer to continuously count down for as long as the SIR meets the requirement, until the timer has counted to zero.

14. The method of claim 13, wherein step (d) further includes: (v) adjusting transmission power of the mobile terminal; and (vi) re-setting the timer when the SIR fails to meet the requirement.

15. A wireless network system for establishing peer-to-peer communication between mobile terminals, comprising: means for receiving a request from a mobile terminal for establishing peer-to-peer communication with another mobile terminal; means for determining whether the peer-to-peer communication can be established; means for transmitting a first group of information including control commands to each of the mobile terminals to start testing characteristics of a dedicated uplink channel between the other one of the mobile terminals and the network system, the transmitting means transmitting the information if the peer-to-peer communication can be established; and means for determining whether the channel characteristics tested by each of the mobile terminals meet a pre-set requirement, the channel characteristics being received by the receiving means; wherein the transmitting means transmits a second group of information including control commands to the mobile terminals to initiate peer-to-peer communication, if the channel characteristics tested by both of the mobile terminals meet the pre-set requirement.

16. The system of claim 15, wherein transmission of the first and second groups of information is from a base station and wherein the determining means further includes: means for estimating a distance between the mobile terminals; and means for determining whether the distance is within an acceptable range.

17. The system of claim 15, wherein the first group of information further includes information about radio resources currently being used by the other one of the mobile terminals for communicating with the network system on the dedicated uplink control.

18. The system of claim 17, wherein the information about the radio resources includes a time slot and a spreading code.

19. The system of claim 17, wherein the second group of Information further includes control commands for enabling each of the mobile terminals to use the same radio resources to establish a dedicated radio channel in the peer-to-peer communication with the other one of the mobile terminals, as those that were previously used by itself for communication with the network system on the dedicated uplink channel.

20. A mobile terminal, comprising: means for transmitting a request to a wireless network system for establishing peer-to-peer communication with another mobile terminal; means for receiving a first group of information including control commands from the network system to start testing characteristics of a dedicated uplink channel between the other mobile terminal and the network system; means for listening to signals transmitted by the other mobile terminal through the dedicated uplink channel; and means for determining whether the channel characteristics meet a pre-set requirement for a pre-determined duration; wherein the transmitting means transmits a status report to the network system if the channel characteristics meet the pre-set requirement for the predetermined duration.

21. The terminal of claim 20, further comprising means for initiating peer-to-peer communication with the other mobile terminal if the receiving means receives a second group of information including control commands from the network system.

22. The terminal of claim 21, further comprising means for disconnecting all dedicated channels with the network system after peer-to-peer communication with the other mobile terminal is established and wherein transmission of the status report is to a base station.

23. The terminal of claim 21, wherein the first group of information further includes information about radio resources currently being used by the other mobile terminal for communicating with the network system on the dedicated uplink channel.

24. The terminal of claim 23, wherein the information about the radio resources includes a time slot and a spreading code.

25. The terminal of claim 23, wherein the transmitting means transmits information to the other mobile terminal in peer-to-peer communication via a dedicated radio channel established by using the same radio resources as those that were previously used by itself for communicating with the network system on the dedicated uplink channel.

26. The terminal of claim 20, wherein determining means calculates a signal-to-interference (SIR) ratio with respect to the dedicated uplink channel between the other mobile terminal and the network system, and determines whether the SIR meets the pre-set requirement.

\* \* \* \* \*